3,457,192
Ni ON SILICA-MAGNESIA-ZIRCONIA CATALYTIC COMPOSITIONS USED IN REFORMING WITH STEAM

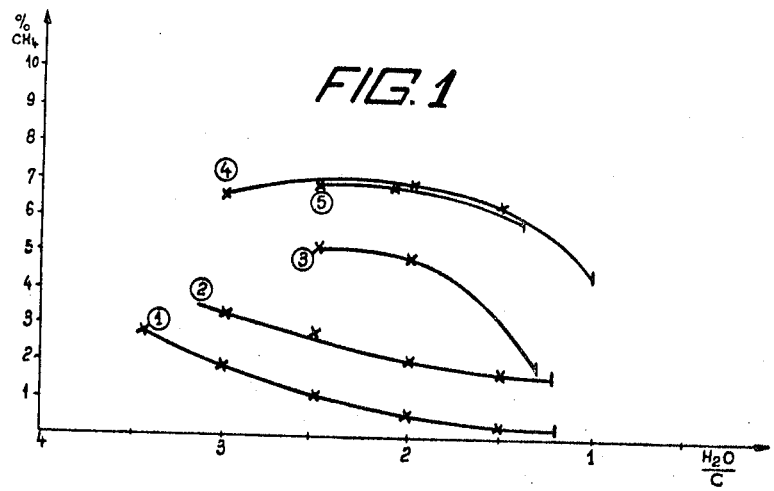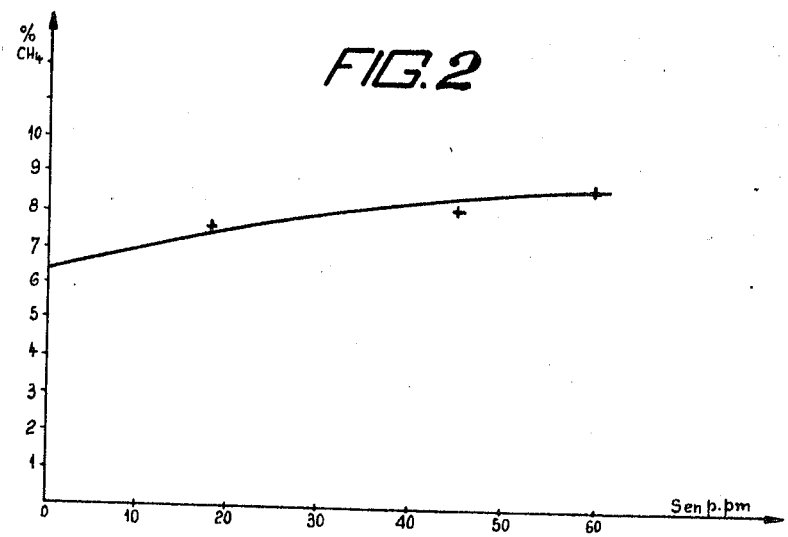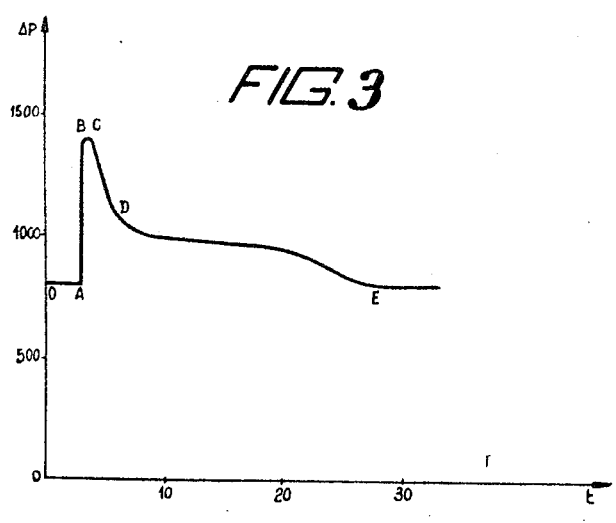

Jean Housset, Saint-Nazaire, Jacques Quibel, Paris, Pierre Honore, Douai, and Robert Pidoux, Saint-Nazaire, France, assignors to LA Societe Chimique de la Grande Paroisse, Azote et Produits Chimiques
Filed Sept. 7, 1965, Ser. No. 485,366
Claims priority, application France, Sept. 25, 1964, 989,346; July 20, 1965, 25,205
Int. Cl. B01j 11/42; C01b 1/08
U.S. Cl. 252—457      9 Claims

ABSTRACT OF THE DISCLOSURE

Catalytic compositions suitable for use in the steam reforming of hydrocarbons heavier than methane and optionally unsaturated, comprising nickel as the active metal between 1–40% by weight calculated as nickel oxide and a mixture of silicon dioxide, magnesium oxide and zirconium dioxide as the support, the magnesium oxide to zirconium oxide ratio by weight being between 1.7 and 2, and the magnesium oxide to silicon dioxide ratio by weight being between 4.5 and 5, these compositions being disposed inside the reforming zone, in the direction of flow of the gas, in several layers having an increasing content of nickel oxide adapted to the evolution of reaction.

---

The present invention relates to new catalytic compositions which can be particularly employed in the reforming of hydrocarbons with steam, more especially hdrocarbons which are heavier than methane, and in particular light petroleum fractions of which the final boiling point is generally between 100 and 250° C. The treated products are mainly formed of paraffinic hydrocarbons, but they may contain unsaturated hydrocarbons up to a molar proportion of approximately 40%.

The generally known catalysts for these processes contain an active metal on a refractory support and permit a high speed of conversion.

According to the conventional processes used in the reforming of hydrocarbons, the tubes are filled with a single catalyst, as is the case for methane. In the procedure of reforming with steam mixtures of hydrocarbons which are heavier than methane, the use of a single catalyst has disadvantages. This technique frequently leads to a too high activity in the entry zone to the catalyst, which causes a thermal cracking and as a consequence a deposition of carbon black, and a too low activity in the outlet zone, which supplies departing gases containing a fairly large proportion of residual methane.

Novel catalytic compositions with a very refractory support have been found according to the invention, which compositions inhibit the thermal cracking and thus the formation of free carbon, and permit of obtaining departing gases which contain a very low residual methane content and an advantageous reforming with a proportion of steam which is practically equal to the minimum theoretical proportion.

These catalytic compositions are characterised in that they have a catalytic activity which is smaller in the entry zone of the gases to be reformed, as the hydrocarbons to be treated are more sensitive to the formation of carbon black, while the refractory oxides forming the support are maintained in constant ratios.

The active metal which forms part of the catalytic compositions is preferably nickel. The nickel content in these compositions, calculated as nickel oxide, is preferably between 1% and 40% by weight.

According to a preferred variant of the invention, the refractory oxides constituting the support are magnesium oxide, zirconium dioxide and silicon dioxide, introduced in such a way that the ratio by weight between magnesium oxide and zirconium dioxide is between 1.7 and 2 and preferably in the region of 1.85, and the ratio between magnesium oxide and silicon dioxide is between 4.5 and 5, preferably in the region of 4.7.

The charging of the reforming zone, for example a tube, is a function of the type of hydrocarbon to be treated. The inlet catalytic compositions, generally the 2 to 3 first metres in the reforming tube, contain from 1% to 10% of nickel oxide.

For a light petroleum fraction containing less than 5% of unsaturated substances, the inlet catalytic composition will contain about 6% of nickel oxide.

The catalytic compositions according to the invention give excellent results with cuts of heavier fractions as with fractions containing a high proportion of olefines. In the case of hydrocarbons comprising 30% of unsaturated substances, the nickel oxide content of the catalyst in the first two metres of the tube will be about 4%, while it will only be approximately 1% for fuel oils; these concentrations are defined so that there will be no deposition of free carbon on the catalyst.

According to the invention, the characteristics of the catalyst are chosen as a function of the evolution of the reaction, and the catalytic compositions are disposed inside the reforming zone in the direction of flow of the gaseous mixture in several layers with an increasing nickel oxide content adapted to the evolution of the reaction. The reforming tube is filled with several different catalytic compositions. In the inlet or entrance zone, the nickel oxide content is below 10%, the purpose of this catalyst being to cause not a very efficient cracking in the temperature range from 450 to 550° C., in order to avoid the thermal cracking, while in the outlet or discharge zone, the content is higher and is generally of the order of 30 to 40%, with the object of obtaining a high reforming rate.

According to one of the features of the invention, the catalytic compositions optionally contain an activating agent in the form of compounds of alkali or alkali earth metals.

According to one modification of the invention, the alkali or alkaline earth metal compounds are introduced in admixture into the catalytic compositions.

These activators may preferably be formed by a potassium sodium, barium or calcium salt, particularly in the form of carbonates, oxides, hydroxides or nitrates, and are more particularly potassium, sodium and calcium carbonates and barium oxide.

According to one preferred form of the present improvement, the activator, of which the content is calculated as oxide, and the active metal, namely the nickel, the content of which is also calculated as oxide, are in a ratio by weight which is between 0.3 and 3.

These activators are introduced into the catalytic compositions in accordance with the present invention by one or other of the two methods indicated below, which enable them to be easily introduced into the catalysts.

The first of these methods consists in introducing the activator by impregnating the active metal deposited on the support in a solution which contains the activator.

According to the second method, the activator is introduced in powder form at the time of forming a paste of the catalyst.

As well as being highly efficient, the new catalytic compositions have the advantage of a high resistivity to sulphur. Certain catalysts permit of carrying out a good reforming with a light petroleum fraction containing up to 60 p.p.m. of sulphur. With the majority of the nickel-type catalysts used industrially for reforming hydrocarbons, the presence of sulphur in the starting material to be treated causes an increase in the methane content of the effluent gases, at constant temperature, and frequently deposits of free carbon on the catalyst. On the contrary, the low sensitivity to sulphur of the new catalytic compositions permits a reduction of the hydrogen introduced for desulphurising the entering gas and thus there is found an improvement by lowering the methane content and also the proportion of hydrogen on discharge.

On the other hand, these catalysts have the advantage of an improved resistance to the poisoning with free carbon, and concurrently provide the possibility of achieving excellent reforming results with low steam proportions, falling down to 1 expressed as $H_2O/C$, the number of molecules of water per atom of carbon. The maximum proportion defined by thermodynamics is reached. These catalysts offer the possibility of permitting the desorption of the free carbon black. When the catalyst becomes clogged as a result of a reduction in the rate of admitted steam, it is sufficient to introduce a rate of flow of steam which is higher than the normal rate in order to resorb the deposited carbon black.

These three characteristics, namely, resistance to poisoning by free carbon, low steam rate (number of water molecules per carbon atom) and high resistance to sulphur, constitute an important technical advance and are of high industrial interest.

The compositions according to the invention offer yet another advantage, which is that of functioning with or without air at the inlet end of the reforming tubes and at relatively low initiating temperatures. When the reformed gas is intended for the synthesis of ammonia, the installation is preferably caused to function without air, using the air with the post-combustion or secondary reforming in order to crack the residual methane of the primary reforming. In certain cases concerned with the preparation of town gas, it is preferred to introduce the air into the tube in order to obtain a certain proportion of nitrogen in the reformed gas. The catalytic compositions having a nickel oxide content lower than 10% at the inlet end of the reforming zone can be successfully used in both cases.

The catalysts are supplied under any one form used in this technique; they are advantageously supplied in the form of cylinders, the height of which is slightly smaller than the diameter. The choice of their dimensions permits of reducing the pressure drops to their minimum. These catalyst cylinders have a certain number of advantages by comparison with Raschig rings. Their mechanical resistance is greater and they have a smaller tendency than the Raschig rings to become charged with carbon black.

It has been observed than when a catalyst starts to become charged with carbon deposit, it is the central hole which is clogged, then a film is formed on the outside and the dust particles or carbon black formed during the reaction tend to become deposited inside the holes of the Raschig rings, where the velocities are much lower than on the outside, particularly when the axes of the holes are not vertical.

The carbon black which adheres to the wall of the central hole can only be removed with difficulty, while that which appears on the outside of the particle is entrained by the gaseous flow and can be attacked by mixture during its transport.

Examples which illustrate the invention in a non-limiting manner are given below.

EXAMPLE 1

(a) Catalytic composition A

Nickel (NiO) from 6 to 10%, preferably about 8%, magnesium oxide (MgO) from 50 to 54%, preferably 52%, zirconium dioxide ($ZrO_2$) from 24 to 34%, preferably 28%, silicon dioxide ($SiO_2$) from 9 to 12%, preferably 11%.

(b) Catalytic composition B

Nickel (NiO) from 2 to 6%, preferably 4%, magnesium oxide from 53 to 56%, preferably 55%, zirconium dioxide from 28 to 32%, preferably 30%, silicon dioxide from 10 to 12%, preferably 11%.

(c) Catalytic composition C

Nickel (NiO) from 30 to 35%, preferably 32%, magnesium oxide from 35 to 40%, preferably 38%, zirconium dioxide from 20 to 27%, preferably 21%, silicon dioxide from 6 to 10%, preferably 8%.

The nickel can vary from 1 to 40%, the other constituents being in the following ratios:

$$\frac{\text{Magnesium oxide}}{\text{Zirconium dioxide}} \text{ 1.7 to 2, preferably 1.85}$$

$$\frac{\text{Magnesium oxide}}{\text{Silicon dioxide}} \text{ 4.5 to 5, preferably 4.7}$$

EXAMPLE 2

In the case of the treatment of a light petroleum fraction with a boiling point which is between 40 and 140° C., a catalytic composition with a nickel oxide content of 8%, on a bed of 3.50 metres, in the temperature zone from 450 to 550° C., avoids any thermal cracking and deposition of free carbon, while the filling of the outlet zone of the tube with a bed of 3.5 metres of catalyst with 32% of nickel oxide leads to a high reforming rate.

EXAMPLE 3

A tube with an internal diameter of 95 mm. is charged with a catalyst having 8% of NiO for a height of 3.50 metres starting from the inlet end, then with a catalyst having 32% of NiO over a height of 3.50 metres, starting from the middle, these two catalysts being in the form of cylinders with a diameter of 15 mm. A light petroleum fraction, of the empirical formula $C_{6.17}H_{14.20}$, with a boiling point between 40 and 140° C., is then introduced downwardly into the tube at a rate of 35 kg. per hour.

In the series of tests, the results of which are set out in the following table, the values shown for the steam rate, which is the ratio of the number of water molecules to a carbon atom, are between 2.35 and 4.3. Certain operations are carried out in the presence of a rate of air flow of 25 m.³/hour and the others in the absence of air. The admission temperatures of the mixture are between 435° and 500° C. The pressure at the outlet end of the tube in gange bars varies from 10 to 19.

| $H_2O/C$ molar | Rate of air flow m.³/h. (at ntp) | Pressure at the outlet end of the tube in actual bars | Admission temperature of the mixture, ° C. | Composition of the departing gas Percent (Calculated as dry gas) | | | | | |
|---|---|---|---|---|---|---|---|---|---|
| | | | | $CO_2$ | CO | $CH_4$ | $C_2H_6$ | $H_2$ | $N_2$ |
| 3.5 | 25 | 10 | 440 | 12 | 11.9 | 3 | 0 | 60.2 | 12.9 |
| 4.3 | 25 | 19 | 435 | 14.7 | 8 | 4 | 0.3 | 60.5 | 12.8 |
| 4.3 | 0 | 19 | 490 | 15 | 10 | 4.7 | 0.2 | 68.6 | 1.5 |
| 2.8 | 0 | 19 | 490 | 12.2 | 12.8 | 7.3 | 0.5 | 65.8 | 1.6 |
| 2.6 | 0 | 19 | 500 | 11.2 | 11.4 | 6.4 | 0.1 | 66.3 | 1.6 |
| 2.35 | 0 | 19 | 490 | 10.9 | 14.2 | 6.8 | 0.1 | 66.3 | 1.7 |

Each test lasted several tens of hours without the pressure drop having shown the slightest increase. The effluent was always free from carbon black.

From studying this table, it is apparent that the association of the active nickel and the refractory components of the support in the proportions as previously defined, in catalysts having very high resistance to mechanical and thermal stresses, and inhibitors of thermal cracking reactions, permits a reforming to be obtained at a steam rate which is practically equal to the minimum theoretical rate.

EXAMPLE 4

(a) Catalytic composition $A_1$

Nickel in NiO from 6 to 10%, preferably about 8%, magnesium oxide (MgO) from 50 to 54%, preferably about 50.5%, zirconium dioxide ($ZrO_2$) from 24 to 34%, preferably about 28%, silicon dioxide ($SiO_2$) from 9 to 12%, preferably about 9%, potassium carbonate in $K_2O$ from 3 to 6%, preferably about 4.5%.

This composition was obtained by alkalisation of the catalytic composition A by soaking in a potassium carbonate solution.

(b) Catalytic composition $A_2$

This catalyst has the same composition by weight as the above catalyst $A_1$, but it differs therefrom by the introduction of the activator in the form of potassium carbonate as a powder at the time of forming the catalyst paste.

(c) Catalyst composition $A_3$

Nickel in NiO from 6 to 10%, preferably about 8%, magnesium oxide (MgO) from 50 to 54%, preferably about 50%, zirconium dioxide ($ZrO_2$) from 24 to 34%, preferably about 31%; silicon dioxide ($SiO_2$) from 9 to 12%, preferably 9%, barium oxide (BaO) from 1.5 to 4%, preferably about 2%.

This composition was obtained by barium oxide in powder form being introduced at the time of forming a paste of a catalytic composition of the type A.

(d) Catalytic composition $A_4$

Nickel in NiO from 6 to 10%, preferably about 8%, magnesium oxide (MgO) from 50 to 54%, preferably about 50%, zirconium dioxide ($ZrO_2$) from 24 to 34%, preferably about 29%, silicon dioxide ($SiO_2$) from 9 to 12%, preferably about 9%, sodium carbonate ($Na_2O$) from 2 to 4%, preferably about 4%.

This composition can be obtained with excellent results by impregnation or by introduction of sodium carbonate in powder form.

(e) Catalytic composition $A_5$

Nickel in NiO, preferably about 8%, magnesium oxide (MgO) preferably about 50%, zirconium dioxide ($ZrO_2$) preferably about 27.5%, silicon dioxide ($SiO_2$) preferably about 9%, barium oxide (BaO) preferably about 1.5%, sodium carbonate ($Na_2O$) preferably about 4%.

(f) Catalytic composition $B_1$ mixture (light petroleum fraction and hydrogen) is magnesium oxide (MgO) from 53 to 56%, preferably about 53%, zirconium dioxide ($ZrO_2$) form 28 to 32%, preferably about 30%, silicon dioxide ($SiO_2$) from 10 to 12%, preferably about 10%, potassium carbonate in $K_2O$ from 3 to 6%, preferably about 3%.

This composition was obtained by alkalisation of the catalytic composition B, by impregnation of the catalyst cylinders in a solution of potassium carbonate.

(g) Catalytic composition $B_2$

This catalyst has the same composition by weight as the above catalyst $B_1$, but it differs therefrom by introducing the activator as a powder at the moment of forming a paste of the catalytic composition.

(h) Catalytic composition $B_3$

Nickel in NiO from 2 to 6%, preferably about 4%, magnesium oxide (MgO) from 53 to 56%, preferably about 53%, zirconium dioxide ($ZrO_2$) from 28 to 32%, preferably about 31%, silicon dioxide ($SiO_2$) from 10 to 12%, preferably about 10%, barium oxide (BaO) from 1.5 to 4%, preferably about 2%.

(i) Catalytic composition $B_4$

Nickel NiO from 2 to 6%, preferably about 4%, magnesium oxide (MgO) from 53 to 56%, preferably about 53%, zirconium dioxide ($ZrO_2$) from 28 to 32%, preferably about 29%, silicon dioxide ($SiO_2$) from 10 to 12%, preferably about 10%, sodium carbonate ($Na_2O$) from 2 to 4%, preferably about 4%.

(j) Catalytic composition $B_5$

Nickel in NiO preferably 4%, magnesium oxide (MgO) preferably 53%, zirconium dioxide ($ZrO_2$) preferably 10%, silicon dioxide ($SiO_2$) preferably 10%, barium oxide (BaO) preferably 1.5%, sodium carbonate ($Na_2O$) preferably 3.5%.

EXAMPLE 5

The different catalytic compositions are tested in an installation which comprises essentially a desulphurisation, a reforming tube and a condensation system for the water contained in the reformed gas; this quantity of water and also the rate of flow of dry gas are measured.

The desulphurisation stage comprises a preheater vaporiser, in which the light petroleum fraction, of the approximate empirical formula $C_6H_{14}$ is vaporised, and the mixture (light petroleum fraction and hydrogen) is superheated to 280° C., and a reactor containing a palladium and zinc oxide catalyst functioning at 320° C. The mixture of steam and gaseous hydrocarbon then passes into a ring-type reactor formed of two tubes. The temperatures are kept constant by regulators acting on 5 heating resistances. By this means, whatever may be the rate of flow of the light petroleum fraction and the proportion of steam (ratio of the number of water molecules to a carbon atom), the temperature range inside the reactor remains substantially the same, the different temperatures extending from approximately 500 to 760° C.

The rate of flow of the light petroleum fraction is in the region of 30 cc. per hour and the rate of flow of hydrogen for the desulphurisation is between 7 and 25 litres per hour. The proportion of steam was varied between 3 and 1.

These reforming tests were carried out at atmospheric pressure. The catalysts used correspond to the catalytic compositions of Example 4, and also the catalytic composition A of Example 1,

| | Percent |
|---|---|
| Nickel in NiO | 8 |
| Magnesium oxide (MgO) | 52 |
| Zirconium dioxide ($ZrO_2$) | 28 |
| Silicon dioxide ($SiO_2$) | 11 | the catalytic composition B, according to Example 1

| | Percent |
|---|---|
| Nickel in NiO | 4 |
| Magnesium oxide (MgO) | 55 |
| Zirconium dioxide ($ZrO_2$) | 30 |
| Silicon dioxide ($SiO_2$) | 11 | and the catalytic composition A with addition of antimony oxide in the form of $SbO_3$, 2.5 to 3%.

(a) Study of the catalytic activity of the catalytic composition $A_1$, under the conditions previously described.—Under the best treatment conditions, 15% of the entering light petroleum fractions is not reformed.

The departing gas contains $C_4$, $C_5$ and $C_6H_6$ hydrocarbons. The lowering of the proportion of steam from 3 to 2 causes a lowering of the quantity of reformed petrol. In addition, there was observed an increase in the pressure drop at the steam proportion 2. After leaving the catalyst of the reforming zone, the presence of a white deposit was found on its surface, but no formation of carbon black. This catalyst gave a not negligible content of ethylene in the departing gas.

(b) Study of the catalytic activity of the composition $A_2$, under the condition described above.—Using this catalyst, activated with potassium carbonate introduced in powder form at the time of making a paste of the catalyst containing the active metal, even at a steam proportion as low as 1, there was obtained a total reforming of the treated light petroleum fraction and a departing gas which contained only 0.1 to 2% of ethylene. It is necessary to reduce the steam proportion to 1 in order to cause a clogging by formation of carbon black.

(c.) Study of the activity of the catalytic composition $A_4$, under the conditions previously described.—On this catalyst, even at a steam rate or proportion as low as 2.2, the entire light petroleum fraction is reformed and the departing gas contains less than 0.5% of ethylene. Below this rate and down to 1.3 (minimum rate investigated), traces of $C_3$, $C_4$ and even $C_6$ hydrocarbons were found.

On a light petroleum fraction not desulphurised, down to 60 p.p.m. of sulphur and for steam rates which are between 1.4 and 1.7, the reforming was good, with traces of $C_4$ and $C_6$ hydrocarbons.

(d) Study of the activity of the catalytic composition A, under the same conditions as used in the preceding tests.—On this catalyst, the lowest admissible steam rate was 1.20 without increasing the pressure drop; below this level, carbon black appeared. It is necessary to note that this catalyst leads to a departing gas having the lowest proportion of methane and an almost complete absence of $C_2$ and higher hydrocarbons.

(e) Study of the activity of the catalytic composition B, under conditions similar to those of the preceding tests.—On this catalyst, down to a steam rate or proportion as low as 1.3, all the light petroleum fraction is reformed, and the departing gas contains little ethylene. However, it was observed that, with a light petroleum fraction containing a few p.p.m. of sulphur, the clogging is only produced on reaching a steam proportion of 1.3, whereas with 95 p.p.m. of sulphur, the clogging appeared with a steam proportion of about 2.4.

(f) Study of the activity of the catalytic composition A, to which antimony oxide is added, under the preceding conditions.—With this type of activator, the light petroleum fraction is not completely reformed. There is still some of the initial petrol in the effluent gas and analysis by chromatography shows that there are $C_4$, $C_5$ and even $C_6$ hydrocarbons present.

The reforming tube is clogged in 2 hours with a steam proportion of about 2, as molecules of water per atom of carbon.

The results of the tests in this example are set out in the following table.

| Catalytic composition | Minimum $CH_4$, Percent | Corresponding molar $H_2O/O$ | Maximum of ethylene Percent | Corresponding $H_2O/O$ | $H_2O/C$ for formation of carbon black | Influence of the sulphur |
|---|---|---|---|---|---|---|
| $A_1$ | | (¹) | (¹) | | | |
| $A_2$ | 4.5 | 1 | 2 | 2.5 | 1 | |
| $A_3$ | 1.7 | 1.2 | (²) | (²) | 1.2 | |
| $A_4$ | 6 | 1.36 | (³) | (³) | 1.3 | Negligible. |
| A | 0.3 | 1.2 | (²) | (²) | 1.2 | |
| B | 2 | 1.3 | 0.5 | | 1.3 | Causes the formation of free carbon. |
| A+antimony oxide | (¹) | (¹) | (¹) | (¹) | (¹) | (¹). |

¹ Does not reform.
² Traces.
³ Constant content.

From reading this table, it is clear that the action of sulphur seems to be of little effect on the catalytic composition $A_4$, whereas it causes a formation of carbon black on the composition B containing 4% of nickel, in NiO form, without activating additive.

As regards the formation of free carbon, it can be noted that the lower limit of the admissible steam proportion varies from 1.2 to 1.3 for the catalytic compositions B, A and $A_4$, containing respectively 4% and 8% of nickel and sodium carbonate as activator in the case of the last composition, while the limit of this steam proportion reaches 1 for the composition $A_2$ having 8% of nickel activated by potassium carbonate introduced in powder form.

The results of these tests permit the conclusion to be reached that the very active catalyst A with 8% of nickel causes a formation of carbon black at a steam proportion higher than the less active catalytic composition $A_2$, and also provide the possibility of estimating that this composition $A_2$ would probably be most suitable for the heavy fractions, and particularly for the reforming of petrols which are sensitive to thermal decomposition. On the contrary, the composition A should be very suitable for reforming light fractions.

In respect of 5 of the catalytic compositions previously studied in connection with the reforming of a petrol fraction of empirical formula $C_6H_{14}$ at atmospheric pressure, the curve of the methane content has been plotted as a function of the steam proportion.

In FIGURE 1 of the accompanying drawing, in which the steam proportion $H_2O/C$, number of water molecules per carbon atom, has been plotted as abscissae, and the percentages of methane have been plotted as ordinates, it is shown that the 5 curves corresponding to the compositions have different paths.

The curves 5, 4 and 3 for the compositions $A_4$, $A_2$ and B have the same path, the maximum methane content being of the same magnitude, particularly for the first two. On the contrary, as regards the composition A, there is found a decreasing function which is represented by the curve 1, of which the minimum value of methane is clearly lower than for the compositions $A_3$ and B represented by the curves 2 and 3; under the conditons of the test, the composition A is more active than the other catalysts.

As regards the maximum ethylene content, the curves have the same path for the different compositions, with the exception of the curve corresponding to the composition A, which only produces traces of ethylene.

In FIGURE 2 of the accompanying drawing, in which the percentage of sulphur expressed as p.p.m. is plotted as abscissae and the percentage of methane is plotted as ordinates, there is represented the variations in the percentage of methane in the effluent gases as a function of the sulphur for the catalytic composition $A_4$. The temperature of the catalyst mass varied from 550° C. at the inlet end to 760° C. at the outlet end of the tube for tests at atmospheric pressure. The content of methane has varied slightly as the sulphur content in the light petroleum fraction increased. 6.4% of methane is noted for a sulphur content lower than 1 p.p.m., and for a steam proportion in the region of 1.6 expressed as $H_2O/C$; for 20 p.p.m. of sulphur, this methane ratio increases to 7.4%, and for 60 p.p.m., it increases to 8.5%.

EXAMPLE 6

Using an industrial tube charged with the catalytic composition A, first of all a desulphurised light petroleum fraction was reformed, and then the content of sulphur was increased while progressively reducing the recycling hydrogen for the catalytic transformation of the sulphur into hydrogen sulphide, which is absorbed by a zinc mass. The decrease in the recycling hydrogen is not initially expressed by an increase in the content of sulphur, but below a certain recycling rate, sulphur appeared at the inlet end of the reforming tube and at the outlet end. Finally, after completely shutting off the recycling, all of the entering sulphur, that is to say, 15 p.p.m., is transferred to the catalyst.

EXAMPLE 7

In an industrial tube containing 60 litres of catalyst with the composition A, there are caused to pass 60 litres per hour of a light petroleum fraction of the approximate empirical formula $C_6H_{14}$ with a steam rate $H_2O/C$ of 2.9.

The installation operates under a pressure of 30 bars at the outlet end of the tube, the temperatures inside the tube ranging from approximately 500 to 800° C. The pressure drop in the tube is 800 g./cm.² A valve regulating the rate of flow of steam is closed for 2 minutes. The light petroleum fraction continues to enter the tube in the absence of steam and it is cracked into carbon and hydrogen. The carbon is deposited on the catalyst, particularly in the first third of the mass. Steam is then once again supplied into the tube at a rate higher then the nominal rate (proportion of $H_2O/C$ of 3.7). There is observed a stabilisation of the pressure drop at 1400 g./cm.², then a fairly rapid decrease. The steam rate is then brought to its nominal value end, over a period of about 20 hours, the pressure drop decreases slowly until it reassumes its nominal value.

The results which are obtained are indicated by FIGURE 3 of the accompanying drawing, in which the time in hours (T) is plotted as absissae and the pressure drop ($\Delta P$) in grams/cm.² is plotted as ordinates.

The rectilinear portion OA represents the stable running at 30 bars with the steam rate $H_2O/C=2.9$, the vertical line AB shows the running without steam, the rate of flow of the light petroleum fraction being kept at the nominal value. The portion BC of the curve corresponds to the stopping of the increase in pressure drop by introduction of steam at the rate $H_2O/C=3.7$, while the descending line CD represents the resorption of a quantity of carbon black formed on the catalyst at the steam rate $H_2O/C=3.7$, and the line at the end the resorption of the carbon black at the normal steam rate $H_2O/C$ of 2.9.

The test carried out in this example leads to the following conclusions:

In the event of an incident in the steam system, the catalyst is able to crack a light petroleum fraction in the absence of steam without being destroyed. If the incident lasted very long, the tube would become completely clogged and it would then be impossible to cause the gases to circulate. It would be necessary to discharge the catalyst, remove the dust and recharge it.

A pressure drop caused by a complete lack of steam for a short period or even by a reduced steam rate for a longer period, can be resorbed, by increasing the rate of flow of steam.

An incident of the type previously described does not lead in most cases to a stoppage of the installation, this being of particular interest for large-capacity installation.

What is claimed is:
1. Catalytic compositions suitable for use in the steam reforming of hydrocarbons heavier than methane, comprising nickel as the active metal between 1–40% by weight calculated as nickel oxide, and a support consisting essentially of a mixture of silicon dioxide, magnesium oxide and zirconium dioxide, the magnesium oxide to zirconium dioxide ratio by weight being between 1.7 and 2, and the magnesium oxide to silicon dioxide ratio by weight being between 4.5 and 5.

2. Catalytic compositions according to claim 1, wherein the ratio by weight of magnesium oxide/zirconium dioxide is approximately 1.85, and the ratio by weight of magnesium oxide/silicon dioxide is approximately 4.7.

3. Catalytic compositions according to claim 1, wherein the content of active metal, calculated as nickel oxide, is between 6% and 10%.

4. Catalytic compositions according to claim 1, wherein the content of active metal, calculated as nickel oxide, is between 2% and 6%.

5. Catalytic compositions according to claim 1, wherein the content of active metal, calculated as nickel oxide, is between 30% and 35%.

6. Catalytic compositions according to claim 1 further containing an activator in the form of alkali or alkaline earth metal compounds, the proportions, expressed as oxides, of activator to oxide of nickel being between 0.3 and 3.

7. Catalytic compositions according to claim 6, wherein the alkali and alkaline earth metal compounds are used in admixture.

8. Catalytic compositions according to claim 6, wherein the activator is a member of the group consisting of the salts of potassium, sodium and barium.

9. Catalytic compositions according to claim 8, wherein the activator is a member of the group consisting of carbonates and oxides.

References Cited

UNITED STATES PATENTS

| | | | |
|---|---|---|---|
| 2,056,911 | 10/1936 | Schiller et al. | 23—212 |
| 2,639,223 | 5/1953 | Shapleigh | 252—457 |
| 2,830,880 | 4/1958 | Shapleigh | 23—212 |
| 2,943,062 | 6/1960 | Mader | 48—196 |
| 3,119,667 | 1/1964 | McMahon | 23—212 |
| 3,132,010 | 5/1964 | Dwyer et al. | 23—212 |
| 3,140,249 | 7/1964 | Plank et al. | 208—120 |

OTHER REFERENCES

Thorpe's Dictionary of Applied Chemistry, vol. XI, p. 1110–1111, Longhams Green and Co., N.Y.

DANIEL E. WYMAN, Primary Examiner

P. E. KONOPKA, Assistant Examiner

U.S. Cl. X.R.

23—212, 214; 252—459

PO-1050
(5/69)

UNITED STATES PATENT OFFICE
CERTIFICATE OF CORRECTION

Patent No. 3,457,192      Dated July 22, 1969

Inventor(s) J. HOUSSET ET AL

It is certified that error appears in the above-identified patent and that said Letters Patent are hereby corrected as shown below:

Column 5, line 61, delete

"mixture (light petroleum fraction and hydrogen) is"

and substitute :

--Nickel in NiO from 2 to 6%, preferably about 4%--

(typed specification page 10, line 19)

SIGNED AND
SEALED
APR 14 1970

(SEAL)
Attest:

Edward M. Fletcher, Jr.
Attesting Officer

WILLIAM E. SCHUYLER, JR.
Commissioner of Patents